Patented Aug. 15, 1950

2,518,737

UNITED STATES PATENT OFFICE 2,518,737

METHINE DYES CONTAINING AN ISOQUINOLINE NUCLEUS

Frank L. White and Leslie G. S. Brooker, Rochester, N. Y., assignors to Eastman Kodak Company, Rochester, N. Y., a corporation of New Jersey No Drawing. Application April 19, 1946, Serial No. 663,619

3 Claims. (Cl. 260—240.6)

This invention relates to methine dyes containing an isoquinoline nucleus and to a process for preparing the same.

One of the earliest photographic sensitizing dyes contained an isoquinoline nucleus. This was Isoquinoline Red (originally and mistakenly called Quinoline Red) which has the following formula:

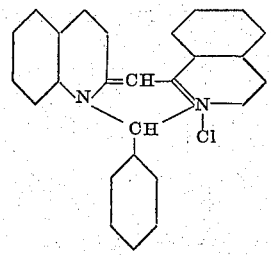

This methine dye differs from the usual cyanine type of dye in not containing a separate organic radical attached to each of the nitrogen atoms.

Mills and Smith, J. Chem. Soc. 1922, 121, 2724 prepared 1-methylisoquinoline methiodide and condensed it with p-dimethylaminobenzaldehyde to obtain 1 - p - dimethylaminostyrylisoquinoline methiodide. Mills and Smith also heated 1-methylisoquinoline methiodide with alcoholic soda and quinoline ethiodide. An intense red color developed in a few minutes and the solution showed a double absorption band in the green. From this, Mills and Smith concluded that an isocyanine dye had been formed, but they isolated no dye.

Fisher and Hamer, J. Chem. Soc. 1934, 1905 succeeded in preparing certain monomethine cyanine dyes by condensing a 1-iodoisoquinoline alkiodide with quinaldine methiodide, with 2-methylbenzothiazole ethiodide, with 2-methyl-β-naphthothiazole ethiodide, with 2-methylbenzoselenazole ethiodide, with 2,4-dimethylthiazole ethiodide, etc. Fisher and Hamer found that these monomethine cyanine dyes containing an isoquinoline nucleus sensitized photographic silver halide emulsions, but did so in a much weaker manner than did the corresponding monomethine cyanine dyes containing a quinoline nucleus.

We have now found that 1-methylisoquinoline alkyl quaternary salts can be condensed with cyclammonium alkyl quaternary salts containing a β-arylaminovinyl group to give carbocyanine dyes, and with other intermediates to give still other polymethine dyes, e. g. merocarbocyanine dyes. The carbocyanine and merocarbocyanine dyes obtained in accordance with our invention are sensitizers of photographic silver halide emulsions.

That our new dyes show sensitizing action was not to be expected because 1,1'-diethyl-3,4,3',4'-dibenzo-2,2'-carbocyanine iodide which contains two isoquinoline nuclei as shown in the following formula:

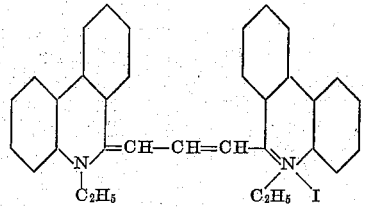

is wholly devoid of any photographic sensitizing action. See Brooker and Keyes, J. Am. Chem. Soc. 58, 659 (1936).

It is, accordingly, an object of our invention to provide new methine dyes. A further object is to provide a process for preparing such dyes. A still further object is to provide photographic silver halide emulsions sensitized with dyes. Other objects will become apparent hereinafter.

In accordance with our invention we provide carbocyanine dyes which are represented by the following general formula:

I.

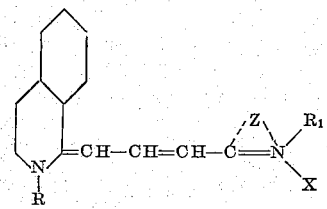

wherein R and $R_1$ each represents an alkyl group, i. e. an alcohol radical, e. g. methyl, ethyl, n-propyl, n-butyl, isobutyl, allyl, β-ethoxyethyl, β-hydroxyethyl, benzyl, β-phenylethyl, β-acetylethyl, β-acetoxyethyl, etc., X represents an anion, e. g. chloride, bromide, iodide, thiocyanate, perchlorate, p-toluenesulfonate, acetate, methylsulfate, ethylsulfate, etc. and Z represents the nonmetallic atoms necessary to complete a heterocyclic nucleus containing from 5 to 6 atoms in the heterocyclic ring, e. g. a heterocyclic nucleus of the thiazole series (for instance thiazole, 4-methylthiazole, 4-phenylthiazole, 4,5-diphenylthiazole, etc.), a heterocyclic nucleus of the benzothiazole series (for instance benzothiazole, 5-chlorobenzothiazole, 6-chlorobenzothiazole, 5-dimethylaminobenzothiazole, 6-methoxybenzothiazole, 6-methylbenzothiazole, 5-methylbenzothiazole, 5- bromobenzothiazole, 4-methoxybenzothiazole, 7-chlorobenzothiazole, etc.), a heterocyclic nucleus of the napthothiazole series (for instance α-naphthothiazole, β-napthothiazole, etc.), a heterocyclic nucleus of the selenazole series (for instance selenazole, 4-methylselenazole, 4-phenylselenazole, etc.), a heterocyclic nucleus of the benzoselenazole series (for instance benzoselenazole, 5-chlorobenzoselenazole), a heterocyclic nucleus of the benzoxazole series (for instance benzoxazole, 5-phenylbenzoxazole, 5-chlorobenzoxazole, 5-methoxybenzoxazole, etc.), a heterocyclic nucleus of the quinoline (1-benzazine) series (for instance quinoline, 6-methoxyquinoline, 6-chloroquinoline, etc.), etc.

To provide unsymmetrical dyes of the above Formula I, we condense a 1-methylisoquinoline alkyl quaternary salt selected from those represented by the following general formula:

II.

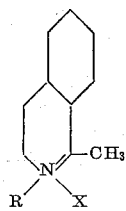

wherein R and X have the values given above, with a cyclammonium alkyl quaternary salt having in the α-position a β-arylaminovinyl group, i. e. a cyclammonium alkyl quaternary salt selected from those represented by the following general formula:

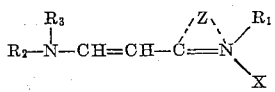

wherein $R_1$, X and Z have the values given above, and $R_2$ represents an aryl group, e. g. phenyl, p-chlorophenyl, p-tolyl, etc. and $R_3$ represents a member selected from the group consisting of a hydrogen atom, an alkyl group (especially methyl or ethyl) and an acyl group (especially acetyl, propionyl or butyryl).

The condensations are advantageously carried out in the presence of an acid-binding agent (basic condensing agent). Tertiary organic amines are advantageously employed as acid-binding agents, especially tertiary organic amines having an ionization constant greater than $10^{-5}$ at 25° C., e. g. trialkylamines (trimethylamine, triethylamine, tri-n-propylamine, tri-n-butylamine, etc.), trihydroxyalkylamines (triethanolamine, tripropanolamine, etc.), N-alkylpiperidines (N-methylpiperidine, N-ethylpiperidine, etc.) and so forth. The condensations are advantageously carried out in a solvent, especially an alcohol, e. g. ethyl, n-propyl or n-butyl alcohol, i. e. an alcohol of the formula $C_nH_{2n+1}OH$ wherein $n$ represents a positive integer of from 1 to 4.

To provide symmetrical dyes of the above formula I, i. e. dyes which are represented by the following general formula:

III.

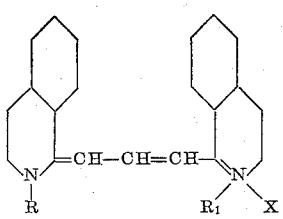

wherein R and X have the values given above, we condense a 1-methylisoquinoline alkyl quaternary salt with chloroform, bromoform, iodoform, chloral hydrate or a chloral alcohate which is prepared from chloral and a primary alcohol of the formula $C_nH_{2n+1}OH$ wherein $n$ represents a positive integer of from 1 to 4, e. g. chloral ethylate. Iodoform is advantageously employed. The condensations are advantageously effected in the presence of an acid-binding agent. Alkali metal hydroxides, e. g. sodium or potassium hydroxide, or alkali metal alcoholates, e. g. sodium methylate, sodium ethylate, potassium propylate, potassium butylate, etc. are advantageously employed. The condensations are advantageously carried out in a solvent, especially an alcohol, e. g. ethyl, n-propyl or n-butyl alcohol, i. e. an alcohol of the formula $C_nH_{2n+1}OH$ wherein $n$ represents a positive integer of from 1 to 4.

It is noteworthy that the above symmetrical dyes represented by Formula III cannot be prepared by condensation of a 1-methylisoquinoline alkyl quaternary salt and an ester of orthoformic acid, e. g. triethyl orthoformate.

The following examples will serve to illustrate further the manner of obtaining our new dyes.

*Example 1.—2,2'-dimethyl-1,1'-isoquinocarbocyanine iodide*

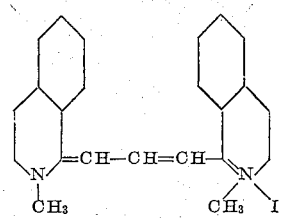

A hot solution of 1.32 g. (4 mols.) of 85% potassium hydroxide in 10 cc. of ethyl alcohol was added to a suspension of 2.85 g. (2 mols.) of 1-methylisoquinoline methiodide and 1.97 g. (1 mol.) of iodoform in 25 cc. of ethyl alcohol. Much dye separated from the blue solution and the mixture was heated at the refluxing temperature for 10 minutes. After chilling at 0° C., the solids were collected on a filter and washed with acetone. The residue on the filter was stirred, in a beaker, with cold water and filtered. The dye collected on the filter was stirred, in a beaker, with hot acetone. After chilling at 0° C., the dye was washed on the filter with acetone. The yield of dye was 68% crude and 51% after two recrystallizations from methyl alcohol (230 cc. per gram of dye). The dark green needles had melting point 262–263° C. with decomposition, and they sensitized a photographic gelatino-silver-bromoiodide emulsion from about 560 mμ to about 680 mμ with a maximum sensitivity at about 650 mμ.

In like manner, 2,2'-diethyl-1,1'-isoquinocarbocyanine iodide was prepared from 1.50 g. (1 mol.) of 1-methylisoquinoline ethiodide. The green crystals from methyl alcohol (130 cc. per gram of dye) had melting point 261–263° C. with decomposition, and they sensitized a photographic gelatino-silver-bromoiodide emulsion from about 560 mμ to about 680 mμ with maximum sensitivity at about 650 mμ.

*Example 2.—3'-ethyl-2-methyl-1-isoquino-oxa-carbocyanine iodide*

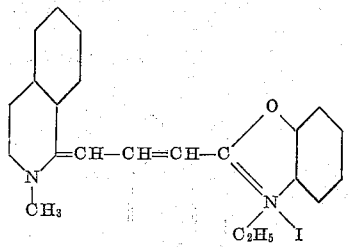

A mixture of 1.43 g. (1 mol.) of 1-methylisoquinoline methiodide, 2.17 g. (1 mol.) of 2-(2-acetanilidovinyl)benzoxazole ethiodide, 10 cc. of pyridine and 0.53 g. (1 mol.+5% excess) or triethylamine was heated at the refluxing temperature for 15 minutes. The cold reaction mixture was stirred with ether. After chilling at 0° C., the solid was collected on a filter and washed with water. The residue on the filter was stirred, in a beaker, with hot acetone. After chilling at 0° C., the dye was collected on a filter and was washed on the filter with acetone. The yield of dye was 50% crude and 28% after two recrystallizations from methyl alcohol (30 cc. per gram of dye). The dark crystals had melting point 231–232° C. with decomposition, and they sensitized a photographic gelatino-silver-bromiodide emulsion to about 615 m$\mu$ with maxima sensitivity at about 530 and 590 m$\mu$.

In like manner, 2,3'-diethyl-1-isoquino-oxacarbocyanine perchlorate was prepared from 1.50 g. (1 mol.) of 1-methylisoquinoline ethiodide by converting the dye iodide to its perchlorate. The dark needles from methyl alcohol (90 cc. per gram of dye) had melting point 213–214° C. with decomposition, and they sensitized a photographic gelatino-silver-bromiodide emulsion to about 610 m$\mu$ with maxima sensitivity at about 530 and 580 m$\mu$.

*Example 3.—3'-ethyl-2-methyl-1-isoquinothiacarbocyanine iodide*

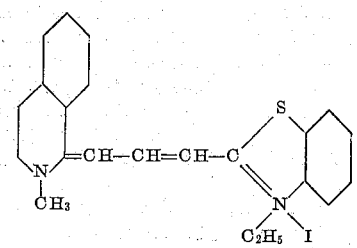

A mixture of 1.43 g. (1 mol.) of 1-methylisoquinoline methiodide, 2.11 g. (1 mol.) of 2-[2-(N-methylanilino)vinyl]benzothiazole ethiodide, 10 cc. of pyridine and 0.53 g. (1 mol.+5% excess) of triethylamine was heated at the refluxing temperature for 20 minutes. The cold reaction mixture was stirred with ether. After chilling at 0° C., the solid was collected on the filter and washed with water. The residue on the filter was stirred, in a beaker, with hot acetone. After chilling at 0° C., the dye was washed onto the filter with acetone. The yield of dye was 64% crude and 38% after two recrystallizations from methyl alcohol (45 cc. per gram of dye). The dark crystals with a green reflex had melting point 245–246° C. with a decomposition, and they sensitized a photographic gelatino-silver-bromiodide emulsion to about 650 m$\mu$ with maximum sensitivity at about 615 m$\mu$.

In like manner 2,3'-diethyl-1-isoquinothiacarbocyanine iodide was prepared from 1.50 g. (1 mol.) of 1-methylisoquinoline ethiodide. The very dark crystals from ethyl alcohol (40 cc. per gram of dye) had melting point 222–223° C. with decomposition, and they sensitized a photographic gelatino-silver-bromiodide emulsion to about 650 m$\mu$ with maximum sensitivity at about 615 m$\mu$.

In the manner shown in the foregoing Example 1, 2,2'-di-n-propyl-1,1'-isoquinocarbocyanine iodide, 2,2'-di-n-butyl-1,1'-isoquinocarbocyanine iodide, 2,2'-di-$\beta$-ethoxyethyl-1,1'-isoquinocarbocyanine iodide, etc. can be prepared. In the manner shown in the foregoing Examples 2 and 3, 2-methyl-3'-n-propyl-1-isoquino-oxacarbocyanine iodide, 3'-n-butyl-2-methyl-1-isoquinooxacarbocyanine iodide, 3'-isobutyl-2-ethyl-1-isoquinoselenacarbocyanine iodide, 3'-ethyl-2-methyl - 4' - phenyl - 1 - isoquinothiazolocarbocyanine iodide, 3'-ethyl-2-methyl-1-isoquino-4',5'-benzothiacarbocyanine iodide, etc. can be prepared.

In accordance with our invention, we also provide merocarbocyanine dyes which are represented by the following general formula:

IV.

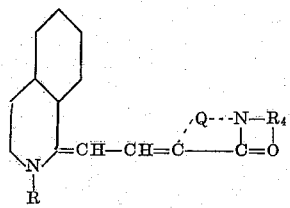

wherein R represents an alkyl group, i. e. an alcohol radical, e. g. methyl, ethyl, n-propyl, n-butyl, isobutyl, allyl, $\beta$-ethoxyethyl, $\beta$-hydroxyethyl, benzyl, $\beta$-phenylethyl, $\beta$-acetylethyl, $\beta$-acetoxyethyl, etc., $R_4$ represents a hydrogen atom, an alkyl group, i. e. an alcohol radical, e. g. methyl, ethyl, $\beta$-hydroxyethyl, carboxymethyl, $\beta$-carboxyethyl, $\beta$-sulfoethyl, etc., or an aryl group, e. g. phenyl, p-dimethylaminophenyl, p-carboxyphenyl, p-sulfophenyl, etc. and Q represents the non-metallic atoms necessary to complete a heterocyclic nucleus containing 5 atoms in the heterocyclic ring, e. g. a nucleus of the rhodanine series, a nucleus of the 2-thio-2,4(3,5)-oxazoledione series, a nucleus of the 2-thiohydantoin series, etc.

To provide the merocarbocyanine dyes of the above general Formula IV, we condense a 1-methylisoquinoline alkyl quaternary salt selected from those represented by the above general Formula II with a compound selected from those represented by the following general formula:

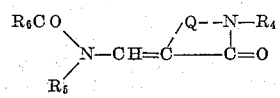

wherein Q and $R_4$ have the values given above, $R_5$ represents an aryl group, e. g. phenyl, p-chlorophenyl, p-tolyl, etc. and $R_6$ represents an alkyl group, e. g. methyl, ethyl, propyl, etc.

The condensations are advantageously carried out in the presence of an acid-binding agent (basic condensing agent). Tertiary organic amines are advantageously employed as acid-binding agents, especially tertiary organic amines having an ionization constant greater than $10^{-5}$, examples of which are shown above. The condensations are advantageously carried out in a solvent, especially an alcohol, e. g. ethyl, n-propyl or n-butyl alcohols, i. e. an alcohol of the formula $C_nH_{2n+1}OH$ wherein $n$ represents a positive integer of from 1 to 4.

The following examples will serve to illustrate further the manner of obtaining our new merocarbocyanine dyes:

*Example 4.—3-ethyl-5-[(2-ethyl-1(2)-isoquinolylidene)ethylidene]-rhodanine*

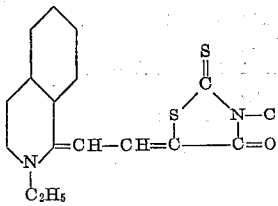

A mixture of 1.50 g. (1 mol.) of 1-methylisoquinoline ethiodide, 1.53 g. (1 mol.) of 5-acetanilidomethylene-3-ethyl-rhodanine, 15 cc. of ethyl alcohol and 0.53 g. (1 mol.+5% excess) of triethylamine was heated at the refluxing temperature for 30 minutes. The cold reaction mixture was stirred with ether. After standing at 0° C., the solid was collected on a filter. The residue on the filter was stirred, in a beaker, with water and filtered. The dye was stirred, in a beaker, with methyl alcohol. After chilling at 0° C., the dye was filtered off and washed on the filter with methyl alcohol. The yield of dye was 50% crude and 38% after two recrystallizations from acetone (140 cc. per gram of dye). The coppery crystals with green reflux had melting point 193–194° C. with decomposition, and they sensitized a photographic gelatine-silver-bromiodide emulsion to about 640 m$\mu$.

In like manner, 3-ethyl-5-[(2-methyl-1(2)-isoquinolylidene)ethylidene]rhodanine was prepared from 1.43 g. (1 mol.) of 1-methylisoquinoline methiodide. The dark blue needles from acetone (200 cc. per gram of dye) had melting point 226–227° C. with decomposition, and they sensitized a photographic gelatino-silver-bromiodide emulsion from about 535 m$\mu$ to about 620 m$\mu$.

In a manner like that illustrated in the foregoing example, 5-[(2-n-propyl-1(2)-isoquinolylidene)ethylidene]-3-phenyl-rhodanine, 5-[(2-n-butyl - 1(2) - isoquinolylidene)ethylidene]-3-$\beta$-hydroxyethylrhodanine, 3 - ethyl - 5-[(2-ethyl-1(2)-isoquinolylidene) - ethylidene]-2-thio-2,4-3,5)-oxazoledione, 5-[(2-ethyl-1(2)-isoquinolylidene)ethylidene]-1,3-diphenyl - 2 - thiohydantoin, 4-[(2-ethyl-1(2)-isoquinolylidene) - ethylidene] - 3 - methyl-1-phenyl-5-pyrazolone, 4-[2-methyl - 1(2) - isoquinolylidene)ethylidene]-3-methyl-1-sulfophenyl-5-pyrazolone, 3 - carboxymethyl-5-[(2-ethyl-1(2) - isoquinolylidene)ethylidene]-rhodanine, etc, can be prepared.

In accordance with our invention, we also provide pyrrolocarbocyanine salts (or dyes) which are represented by the following general formula:

V. 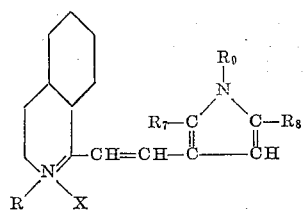

wherein R and X have the values given above, $R_7$ and $R_8$ each represents an alkyl group, especially a methyl group, and $R_9$ represents an alkyl group, e. g. ethyl, n-butyl, isobutyl, n-heptyl, lauryl, cetyl, etc., or an aryl group, e. g. phenyl.

To provide pyrrolocarbocyanine dyes of the above general Formula V, we condense a 1-methylisoquinoline alkyl quaternary salt selected from those represented by the above general Formula II with a pyrrole aldehyde selected from those represented by the following general formula:

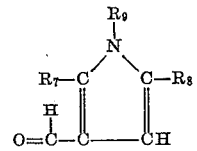

wherein $R_7$, $R_8$ and $R_9$ have the values set forth above.

The condensations are advantageously carried out in the presence of an amine, e. g. piperidine, or a carboxylic anhydride, e. g. acetic anhydride.

The following example will serve to illustrate further the manner of obtaining our new pyrrolocarbocyanine dyes.

*Example 5.—2,2',5'-trimethyl-1' - phenyl-1-isoquino-3'-pyrrolocarbocyanine iodide*

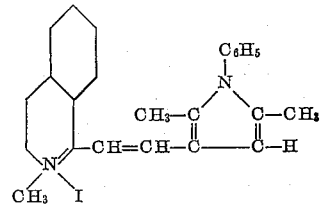

A mixture of 1.43 g. (1 mol.) of 1-methylisoquinoline methiodide, 1.00 g. (1 mol.) of 2,5-dimethyl-1-phenyl-3-pyrrolecarboxaldehyde, 10 cc. of ethyl alcohol and 0.2 cc. of piperidine was heated at the refluxing temperature for two hours. The cold reaction mixture was stirred with ether. After chilling at 0° C., the solid was collected on a filter and washed with ether. The residue on the filter was stirred, in a beaker, with water. After standing at room temperature for about one hour, the solid was washed on the filter with water. The residue on the filter was stirred, in a beaker, with hot acetone. After chilling at 0° C. the dye was washed onto the filter with acetone. The yield of dye was 56% crude and 39% after two recrystallizations from ethyl alcohol (80 cc. per gram of dye). The amber crystals had melting point 243–245° C. with decomposition.

In like manner, 1-ethyl-2',5'-dimethyl-1'-phenyl-1-isoquino-3'-pyrrolocarbocyanine perchlorate was prepared from 1.50 g. (1 mol.) of 1-methylisoquinoline ethiodide by converting the dye iodide to its perchlorate with a hot aqueous solution of sodium perchlorate. The brownish-yellow plates from ethyl alcohol (40 cc. per gram of dye) had melting point 195°–196° C. with decomposition.

Neither of the above dyes sensitized a photographic gelatino-silver-chlorobromoiodide emulsion.

In a manner similar to that illustrated in the foregoing example, 1'-lauryl-2,2',5'-trimethyl-1-isoquino - 3' - pyrrolocarbocyanine perchlorate, 1',2-diethyl-2',5'-dimethyl - 1 - isoquino-3'-pyrrolocarbocyanine perchlorate, 2-$\beta$-hydroxyethyl-1'-lauryl-2',5'-dimethyl - 1 - isoquino-3'-pyrrolocarbocyanine perchlorate, 2-$\beta$-ethoxyethyl-1'-ethyl-2',5'-dimethyl - 1 - isoquino-3'-pyrrolocarbocyanine perchlorate, etc. can be prepared.

In accordance with our invention, we also provide symmetrical monomethine cyanine dyes which can be represented by the following general formula:

VI.

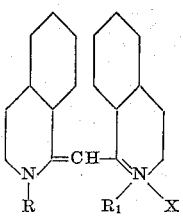

wherein R, R₁ and X have the values given above. These dyes cannot be planar.

To provide the new dyes represented by Formula VI, we condense a 1-methylisoquinoline alkyl quaternary salt selected from those represented by the above general Formula II with a 1-alkylmercaptoisoquinoline alkyl quaternary salt selected from those represented by the following general formula:

VII.

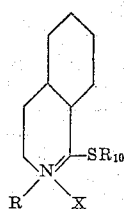

wherein R and X have the values given above, and $R_{10}$ represents an alkyl group, e. g. methyl, ethyl, n-propyl, n-butyl, isobutyl, etc.

The condensations are advantageously effected in the presence of an acid-binding agent (basic condensing agent). Tertiary organic amines are advantageously employed as acid-binding agents, especially tertiary organic amines having an ionization constant greater than $10^{-5}$, examples of which are shown above. The condensations are advantageously carried out in a solvent, especially in alcohol, e. g. ethyl, n-propyl, or n-butyl, i. e. an alcohol of the formula $C_nH_{2n+1}OH$ wherein $n$ represents a positive integer of from 1 to 4.

The following example will serve to illustrate further the manner of obtaining our new monomethine dyes.

*Example 6.—2,2'-dimethyl-1,1'-isoquinocyanine perchlorate*

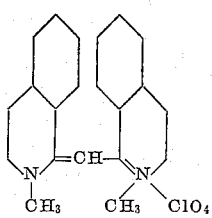

A mixture of 0.83 g. (1 mol.) of 2-methyl-1(2)-thioisoquinolone and 0.93 g. (1 mol.) of methyl p-toluenesulfonate were heated together at the temperature of the steam bath for 6 hours. To the crude quaternary salt were added 1.43 g. (1 mol.) of 1-methylisoquinoline methiodide, 15 cc. of ethyl alcohol and 0.53 g. (1 mol.+5% excess) of triethylamine and the mixture was heated at the refluxing temperature for 20 minutes. The cool reaction mixture was decanted. The residue was dissolved in hot methyl alcohol, and a hot solution of sodium perchlorate (3 g.) in water was added. After chilling at 0° C., the solid was collected on a filter and washed with water. The residue on the filter was stirred in a beaker, with hot ethyl alcohol. After chilling, the dye was filtered off and washed on the filter with ethyl alcohol. The yield of dye was 33% crude and 23% after two recrystallizations from methyl alcohol (50 cc. per gram of dye). The dark red crystals with green reflex had melting point 214–216° C. with decomposition, and they showed a trace of sensitization to about 570 mμ in a photographic gelatino-silver-bromoiodide emulsion.

In a manner like that illustrated in the foregoing example, 2-ethyl-2'-methyl-1,1'-isoquinocyanine iodide and perchlorate, 2,2'-di-n-propyl-1,1'-isoquinocyanine iodide and perchlorate, 2,2'-di-n-butyl-1,1'-isoquinocyanine iodide, 2,2'-di-β-ethoxyethyl-1,1'-isoquinocyanine iodide and perchlorate, 2,2'-di-β-hydroxyethyl-1,1'-isoquinocyanine iodide and perchlorate, etc. can be prepared.

The 1-methylisoquinoline alkyl quaternary salts and the 1-alkylmercaptoisoquinoline alkyl quaternary salts employed in our invention can be prepared as described in our copending application Serial No. 663,620, filed of even date herewith.

It will be observed from the foregoing that the carbocyanine and merocarbocyanine dyes of our invention sensitize photographic silver halide emulsions, but that the pyrrolocarbocyanine dyes do not, while the monomethine cyanine dyes show a negligible sensitizing action. The pyrrolocarbocyanine dyes and the monomethine cyanine dyes are useful in the preparation of light filters for photographic purposes and can be employed in photographic elements for such purposes.

To prepare photographic emulsions sensitized with our new carbocyanine and merocarbocyanine dyes, it is only necessary to disperse the dyes in the emulsions. It is convenient to add the dyes to the emulsions from solutions in appropriate solvents. Acetone (for the merocarbocyanine dyes) and methyl alcohol (for the carbocyanine dyes) have proven satisfactory as solvents for this purpose. Sensitization by means of these dyes is, of course, primarily directed to the ordinarily employed gelatino-silver-halide developing-out emulsions. The dyes are ordinarily incorporated in the washed, finished emulsions and should, of course, be uniformly distributed throughout the emulsion. The concentration of the dyes in the emulsions can vary widely, i. e. from about 5 to about 100 mg. per liter of flowable emulsions. The concentration of the dye will vary according to the type of light-sensitive material in the emulsion and according to the effect desired. The suitable and most economical concentration for any given emulsion will be apparent to those skilled in the art upon making the ordinary tests and observations customarily employed in the art of emulsion making. To prepare a gelatino-silver-halide emulsion sensitizing with one of these dyes, the following procedure is satisfactory. A quantity of the dye is dissolved in acetone, methyl alcohol or other suitable solvent, and a volume of this solution (it may be diluted with water) containing from 5 to 100 mg. of dye is slowly added to about 1000 cc. of gelatino-silver-halide emulsion, with stirring. Stirring is continued until the dye is uniformly distributed throughout the emulsion. With most of these sensitizing dyes, 10 to 20 mg. of dye per liter of emulsion suffices to produce the maximum sensitizing effect with the ordinary gelatino-silver-bromide (including bromiodide) emulsions. With gelatino-silver-chloride emulsions somewhat larger concentrations are required to produce the optimum sensitizing effect. The above statements are only illustrative and are not to be understood as limiting our invention, as it will be apparent that these dyes can be incorporated by other methods in the photographic silver halide emulsions customarily employed in the art. For instance, the dyes may be incorporated by bathing a plate or film upon which an emulsion has been coated in a solution of the dye in an appropriate solvent. Bathing methods, however, are not to be preferred ordinarily.

What we claim as our invention and desire to be secured by Letters Patent of the United States is:

1. The carbocyanine dyes which are represented by the following general formula:

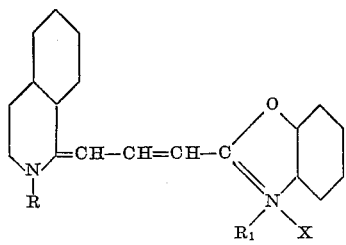

wherein R and $R_1$ each represents an alkyl group of the formula $C_nH_{2n+1}$ wherein $n$ represents a positive integer of from 1 to 4, and X represents an anion.

2. The carbocyanine dye which is represented by the following formula:

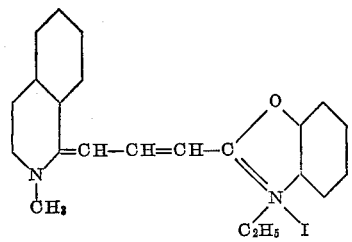

3. The carbocyanine dye which is represented by the following formula:

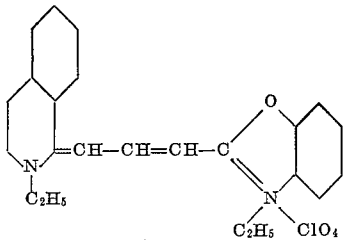

FRANK L. WHITE.
LESLIE G. S. BROOKER.

REFERENCES CITED

The following references are of record in the file of this patent:

UNITED STATES PATENTS

| Number | Name | Date |
|---|---|---|
| 2,071,899 | Piggot | Feb. 23, 1937 |
| 2,108,484 | Hamer | Feb. 15, 1938 |
| 2,153,931 | Barent | Apr. 11, 1939 |
| 2,189,599 | Brooker | Feb. 6, 1940 |
| 2,202,827 | Brooker | June 4, 1940 |

FOREIGN PATENTS

| Number | Country | Date |
|---|---|---|
| 576,532 | Germany | 1933 |

OTHER REFERENCES

Hamer J. Chem. Soc. 121, pages 2724–2737 (1922).